United States Patent
Schmermund

[15] 3,656,403
[45] Apr. 18, 1972

[54] CONTROL ARRANGEMENTS FOR AN AUTOMATIC MACHINE TOOL

[72] Inventor: Alfred Schmermund, 5820 Gevelsberg, Postfach 144, Germany

[22] Filed: Oct. 8, 1970

[21] Appl. No.: 79,161

[30] Foreign Application Priority Data

Oct. 23, 1969 Great Britain..................52039/69

[52] U.S. Cl...............................................90/13.9, 90/13
[51] Int. Cl.................................................B23c 1/16
[58] Field of Search.......................................90/13 R, 13.9

[56] References Cited

UNITED STATES PATENTS 3,437,007  4/1969  Schmermund........................90/13.9

*Primary Examiner*—Gerald A. Dost
*Attorney*—Nolte and Nolte

[57] ABSTRACT

This invention relates to a control arrangement for an automatic machine tool having a pair of identically profiled parallel master plate cams which are mounted on a movable carrier with their profiles reversed with respect to each other. The profile of a selected one of the master cams is sensed by a main follower which is coupled to control means for controlling a milling tool operating on a rotating workpiece. An auxiliary cam is rotated with the workpiece and an auxiliary follower co-operating with the auxiliary cam is coupled to the carrier to control the displacement thereof. At least one end portion of the profile of the selected master cam is linear and disposed parallel to the direction of displacement of the carrier, whereby the displacement of the selected master cam when the main follower is in contact with a linear portion of the profile thereof does not result in displacement of the main follower.

Alternatively, the pair of master cams are replaced by a single reversibly mountable master cam.

4 Claims, 5 Drawing Figures

INVENTOR
ALFRED SCHMERMUND
BY
Nolte & Nolte
ATTORNEYS

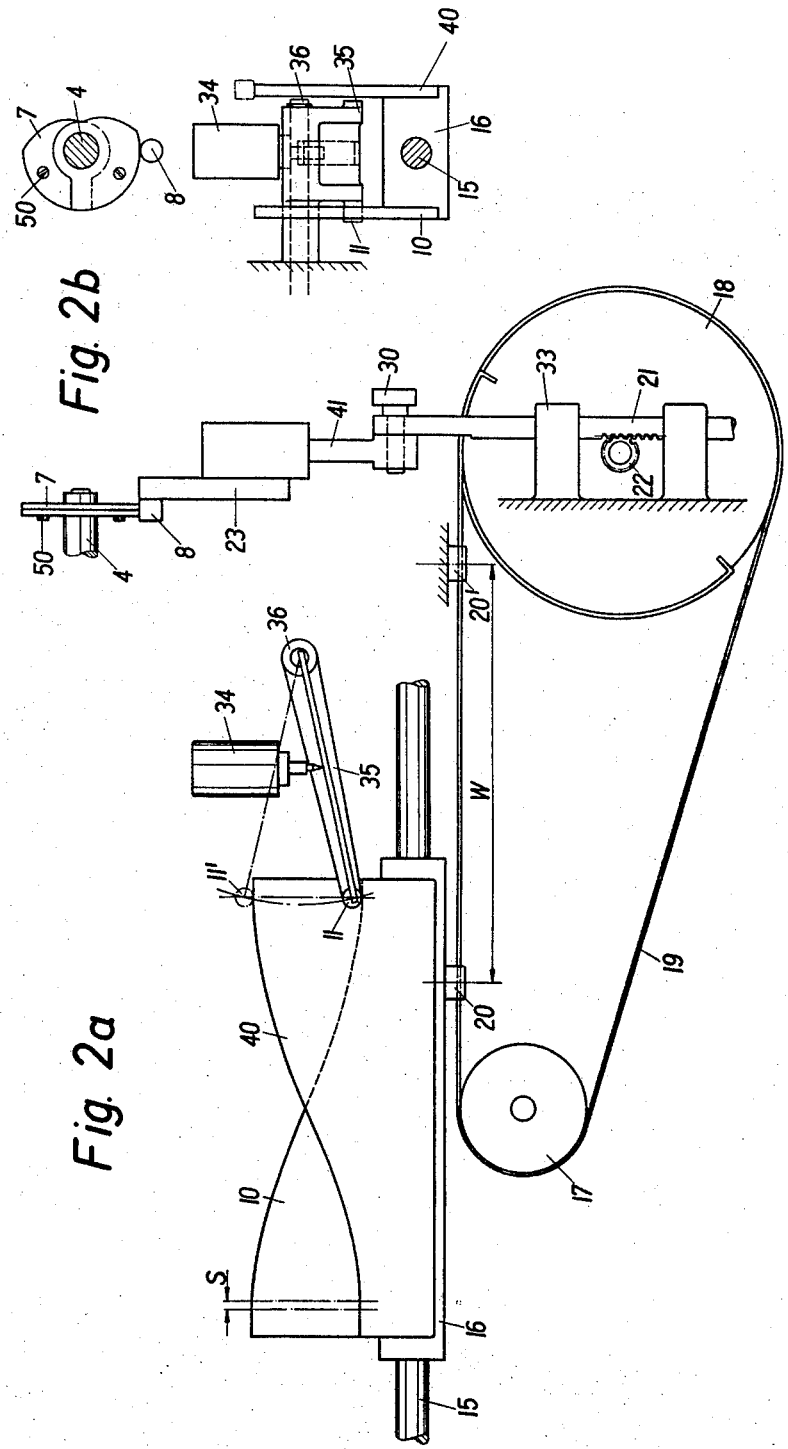

CONTROL ARRANGEMENTS FOR AN AUTOMATIC MACHINE TOOL

BACKGROUND OF THE INVENTION

The present invention relates to a control arrangement for an automatic machine tool for providing curves on workpieces and is an improvement in or a modification of the invention described in U.S. Pat. specification No. 3,437,007. The main claim of U.S. Pat. No. 3,437,007 is as follows:

A control arrangement for an automatic machine tool comprising a movable carrier, an original curve member mounted on said carrier, means sensing the shape of said curve member, means for displacing and moving said sensing means and said original curve member relative to each other, means remote from said curve member and sensing means influencing the relative movement therebetween, control means in association with said curve member and sensing means for controlling the movement of a machine tool head, means linking said influencing means with said curve member and sensing means, said influencing means being capable of varying the speed of relative movement of said sensing means and said original curve member, said control means including a movable control member, means for selectively positioning said control means whereby the ratio of movement of said sensing means and movement of said control member can be varied.

The arrangement described in the above mentioned patent has for certain purposes the disadvantage that some distortion of the path followed by an auxiliary follower included in the influencing means occurs at transitions between arcuate flanks of the profile of a co-operating auxiliary cam and a circular portion of the profile.

SUMMARY OF THE INVENTION

According to one form of the present invention there is provided a control arrangement for an automatic tool comprising a pair of parallel master cams having substantially identical profiles and so arranged that the respective profiles are reversed with respect to each other, means for coupling a main follower to a selected one of the master cams to sense the profile of the selected master cam, control means responsive to the main cam follower and means including an auxiliary cam and auxiliary follower for influencing the time during which the sensing means senses portions of the selected master cam, the auxiliary follower controlling movement of the selected master cam, and means for varying the ratio of movement of the main follower to movement of a control member of the control means, at least a portion of the profile of the selected master cam being linear and substantially parallel to the direction of movement of the selected master cam, the arrangement being such that when the control means is connected to the tool head of the machine and the auxiliary cam is moved in dependence on the rotation of the workpiece, the movement of the selected master cam whilst the main follower is in contact with the or each linear portion does not result in displacement of the main follower so that control of the tool is dependent on the shape of the selected master cam and on a predetermined influence exerted by the auxiliary cam and the ratio varying means.

Alternatively, the arrangement comprises a single reversibly mountable master cam.

BRIEF DESCRIPTION OF THE DRAWINGS

An embodiment of the present invention will now be more particularly described with reference to the accompanying drawings, in which:

FIG. 2a shows an arrangement for displacing a master cam in accordance with displacements of an auxiliary follower which follows the profile of an auxiliary cam;

FIG. 2b shows an end view of part of the arrangement shown in FIG. 2a;

DESCRIPTION OF THE PREFERRED EMBODIMENTS

Figure 1:
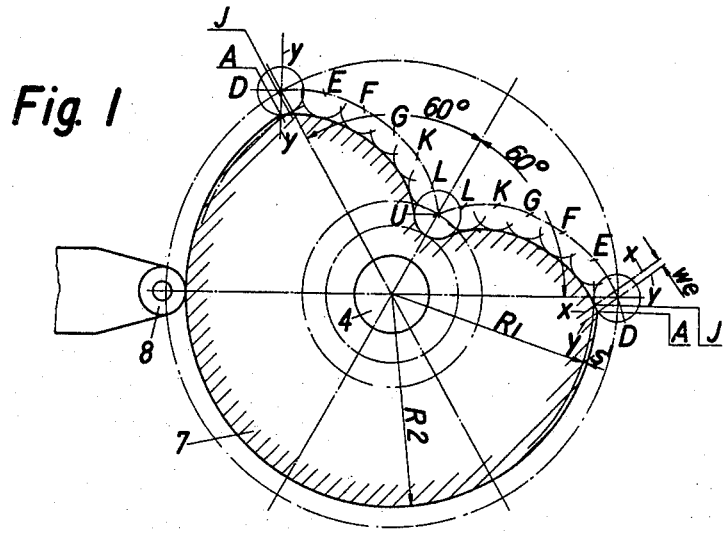
FIG. 1 shows the profile of an auxiliary timing cam and the curve followed by the center of the follower.

As described in the specification of U.S. Pat. No. 3,437,007 the movement of a tool for cutting the cam produced by an automatic tool is controlled in response to displacement of a master follower 34 (FIGS. 2a and 2b). The master follower 34 is coupled to a roller follower 11 by means of a lever 35, which is pivotally supported by a bearing 36. The master follower 34 follows the profile of either a master cam 10 or a master cam 40 and the considerations which determine which of the master cams is selected will be described subsequently. The selected master cam is displaced on its mounting 16 along a guide shaft 15. If, for example, the master cam 10 is selected, the displacement of the master cam 10 is controlled by an auxiliary timing cam 7, which is rotatably mounted on a shaft 4. The cam 7 is rotated synchronously with a workpiece, which is cut by the tool to from a cam. As shown in FIG. 2b, the auxiliary cam 7 comprises two components which are secured together by means of screws, of which one is indicated by the reference 50. The auxiliary cam 7 displaces an auxiliary cam follower 8 and the displacement of the auxiliary follower 8 is transmitted via coupling members 23, 41 and 21 to a drum 18. The coupling members 23 and 41, preferably, form an hydraulic follower as described in the specification of the main patent. The motion of the auxiliary follower 8 is transmitted to the coupling member 21, one and of which is engaged with the coupling member 41 by means of a pin 30. The coupling member 21 is provided with a rack, as shown in FIG. 2, which engages a pinion 22 attached to the drum 18. Consequently, the drum 18 rotates and causes the belt drive 19, passing over a pulley wheel 17, to be displaced. As shown in FIG. 2a, the support 16, which carries the master cams 10 and 40, is attached by means of a clamping member 20 to the belt drive 19.

As the auxiliary cam 7 rotates, a displacement W' is imparted to the auxiliary follower 8 and this displacement produces a displacement W of the master cam 10. The transmission ratio of the coupling between the auxiliary cam 7 and the master cam 10 determines the relative dimensions of the displacements W' and W. The transmission ratio may, for example, be 10:1.

FIG. 1 shows an example of the profile of the auxiliary cam 7 of FIGS. 2a and 2b. As shown in FIG. 1, the cam 7 is so profiled as to impart an outward displacement to the auxiliary follower 8 during a 60° angular rotation of the cam 7, if the auxiliary follower is initially assumed to be located at the internal transition point U of the arcuate path D E F G K L L K G F E D. This curve shows successive positions of the centre of the auxiliary follower 8 relative to the profile of the auxiliary cam 7. The next 240° of angular rotation of the auxiliary cam 7 produce no displacement of the follower 8 and the remaining 60° of angular rotation produce an inward displacement of the auxiliary follower 8. Thus, as the auxiliary cam 7 rotates, the auxiliary follower 8 is displaced by a distance equal to the difference between the radius of the circular portion of the profile and the minimum radius of the cam which, as shown in FIG. 1, corresponds to the portion of the profile supporting the follower 8 when the centre of the follower is located at the internal transition point U. Assuming, for example, that the requisite displacement of the master cam 10 (FIG. 2a) is 720 mm then, if the transmission ratio is 10:1, the auxiliary cam 7 is required to impart a displacement of 72 mm to the auxiliary follower 8 during each rotation of the auxiliary cam 7. The requisite displacement is imparted to the auxiliary follower 8 if the radius of the circular portion of the profile of the cam 7 is R1. As indicated above, the path required to be followed by the centre of the roller of the auxiliary follower 8, which is an Archimedes spiral, is represented by the curve passing through the points D E F G K L U L K G F E D. However, as indicated in FIG. 1, the position of the roller of the auxiliary follower 8 is indicated by the line xx when the roller reaches the transition between the arcuate flank of the profile and the rest circle of radius R1.

Thus, if the cam 7 is provided with a rest circle of radius $R1$, which is determined by transmission ratio of the coupling between the cams 7 and 10 and by the requisite displacement of the master cam 10, the center of the roller of the auxiliary follower does not follow the portion WE (FIG. 1) of the Archimedes spiral, at the external transitions between the arcuate flanks of the cam profile and the rest circle. Thus, some marginal distortion in the path followed by the center of the auxiliary follower 8 occurs.

In order to ensure that the path of the center of the auxiliary follower 8 does conform to an Archimedes spiral, the radius of the rest circle of the cam 7 is extended by an amount $S'$, as shown in FIG. 1. This extension of the radius of the rest circle, provides a corresponding extension of the arcuate flanks of the profile and, as indicated in FIG. 1, this extension shifts the extreme support point of the roller of the auxiliary follower 8 from J to A. When the roller of the auxiliary follower is supported at the point A, its centre is located at the point D, which is the terminating point of the Archimedes spiral. However, extending the radius of the rest circle to R2, that is $R1 + s'$, increases the displacement of auxiliary follower 8 by the amount $S'$. Thus, the displacement imparted to the auxiliary follower now exceeds the requisite displacement, which corresponded to the displacement of the master cam 10. Assuming that the transmission ratio of the coupling between the auxiliary cam 7 and the master cam 10 is such that the increase $S'$ is the displacement of the auxiliary follower 8 results in a corresponding movement S in the displacement of the master cam, it follows that the master cam 10 will be displaced by an amount S beyond the prescribed limit set by the length of its control profile.

In order to compensate for the effects of this increased displacement of the master cam 10, the cam profile is provided as indicated in FIG. 2a with at least one linear portion of length S which is parallel to the direction of its displacement. Since these portions are horizontal, in FIG. 2a, movement of the roller 11 of the master follower 34 over these extended portions does not result in any vertical displacement of the master follower 34.

Therefore, the provision of the horizontal portions S on the profile of the master cam 10 enables the radius of the rest circle of the auxiliary cam to be extended by a corresponding amount $S'$, so as to avoid the distortion in the Archimedes spiral which has been described above.

Figure 3:
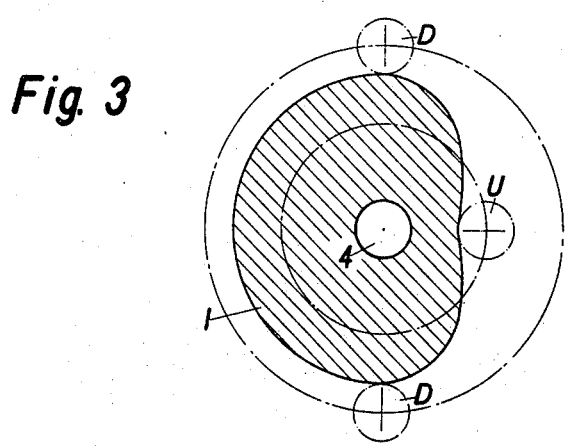
FIG. 3 shows the profile of another cam.
Figure 4:
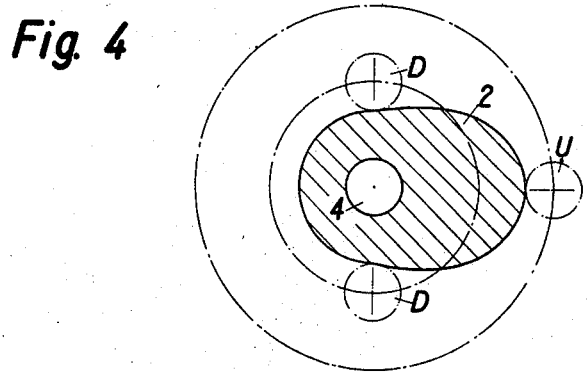
FIG. 4 shows the profile of a further cam.

FIGS. 3 and 4 show the profile of two cams. The cam profile shown in FIG. 3 is similar to that shown in FIG. 1 in that the points of transition D are located outside the internal transition point U. Cams of this type can be machined by means of the cam cutting arrangement which has been described in the specification of U.S. Pat. No. 3,437,007. However, cams of the type shown in FIG. 4 cannot be manufactured by means of the cam cutting arrangement which has been described in the aforementioned U.S. Pat. No. 3,437,007, because the transition point U occurs externally.

In order to enable cams of the type shown in FIG. 4 to be machined, a second master cam 40 is provided. As indicated in FIGS. 2a and 2b, the second master cam 40 is mounted parallel to the master cam 10, and the profile of the second master cam 40 is arranged oppositely to the profile of the first master cam 10. A single coupling member 21 is connected by means of the pin 30 to the coupling member 41. Thus, the support 16, carrying both master cams 10 and 40, is displaced in response to displacements of the auxiliary follower 8.

The roller follower 11 may be carried by either the right hand arm of the pivot lever 35 or by the left hand arm of the pivot lever 35, as shown in FIG. 2b. IN FIG. 2a the position of the follower 11 when following the master cam 40 is indicated by the reference 11'. Thus, the roller follower 11 may follow the profile of either master cam 40 or the profile of the master cam 10. Consequently, the master follower 34, which, as described in the aforementioned U.S. Pat. No. 3,437,007, controls the cutting tool of the machine, may respond either to the shape of the master cam 10 or to the shape of the master cam 40. Thus, the master cams 10 and 40 are alternatively coupled to the master follower 34 via the roller 11 and the pivot lever 35, depending on whether the time controlling auxiliary cam 7 has its transition point located internally, as shown in FIG. 3, or externally as shown in FIG. 4.

A single master cam may be employed. In this case, the single master cam is mounted as indicated in FIG. 2a by the reference 10 when the auxiliary timing cam has an internal transition point. The cam 10 is reversed on the mounting 16, so as to reverse the profile of the cam relative to the follower 11', when the auxiliary timing cam has an external transition point. If a single reversible master cam is employed, two linear portions S may be provided at opposite ends of the profile so as to enable the appropriate over run portion to be followed by the roller 11, in dependence on whether the reversible master cam is located in position 10 or is mounted with its profile reversed so that it is similarly disposed to the profile of the master cam 40.

It is thus possible to provide a linear following of the master cam, as described with reference to FIG. 1 of the aforementioned U.S. Pat. specification No. 3,437,007, in which the deviations of the lever arm comprising the elements 14 and 16 cancel and a linear following by the rod 20 is present for practical purposes.

I Claim:

1. A control arrangement for an automatic machine tool comprising in combination:
   a movable carrier;
   a pair of similar original curve members mounted on said carrier and so arranged that the respective original curves of said curved members are reversed with respect to each other;
   means selectably sensing the shape of one of said curve members;
   means displacing said carrier relative to said sensing means;
   means remote from said curve members and said sensing means influencing the relative movement therebetween;
   control means in association with said sensed curve member and said sensing means for controlling the movement a machine tool head;
   means linking said influencing means with said curve members and said sensing means;
   said influencing means including an auxiliary cam, an auxiliary follower arranged to co-operate with said auxiliary cam and means for rotating said auxiliary cam with a workpiece;
   said influencing means being capable of varying the speed of relative movement of said sensing means and said selected curve member;
   said sensing means including a main follower in contact with the original curve of said selected curve member;
   said control means including a movable control member;
   means for selectively positioning said control means to vary the ratio of movement of said sensing means and said control member;
   at least one end portion of the respective original curves of said curve members being linear and substantially parallel to the direction of displacement of said carrier, whereby the displacement of said selected curve member when said main follower is in contact with said at least one linear portion thereof results in said main follower remaining static.

2. An arrangement as defined in claim 1, wherein said pair of original curve members comprise a pair of mutually spaced and substantially parallel plate cam members.

3. A control arrangement for an automatic machine tool comprising in combination:
   a movable carrier;
   an original curve member reversibly mountable on said carrier;
   means sensing the shape of said curve member;
   means displacing said carrier relative to said sensing means;
   means remote from said curve member and said sensing means influencing the relative movement therebetween;

control means in association with said curve member and said sensing means for controlling the movement of a machine tool head;

means linking said influencing means with said curve member and said sensing means;

said influencing means including an auxiliary cam, an auxiliary follower arranged to co-operate with said auxiliary cam and means for rotating said auxiliary cam with a workpiece;

said influencing means being capable of varying the speed of relative movement of said sensing means and said curve member;

said sensing means including a main follower in contact with the original curve of said curve member;

said control means including a movable control member;

means for selectively positioning said control means to vary the ratio of movement of said sensing means and said control member;

two opposite end portions of the original curve of said curve member being linear and substantially parallel to the direction of displacement of said carrier, whereby the displacement of said curve member when said main follower is in contact with said linear portions thereof results in said main follower remaining static.

4. An arrangement as defined in claim 3, wherein said original curve member comprises a plate cam member.

* * * * *